US 6,983,606 B2
Jan. 10, 2006

(12) United States Patent
Brown

(54) INTEGRATED GAS TURBINE COMPRESSOR-ROTARY FUEL INJECTOR

(75) Inventor: Wesley Brown, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 243 days.

(21) Appl. No.: 10/657,968

(22) Filed: Sep. 9, 2003

(65) Prior Publication Data

US 2004/0045302 A1    Mar. 11, 2004

Related U.S. Application Data

(60) Provisional application No. 60/409,108, filed on Sep. 9, 2002.

(51) Int. Cl.
    F02C 7/22    (2006.01)

(52) U.S. Cl. .............................. 60/776; 60/804; 60/745

(58) Field of Classification Search ................ 415/168; 60/776, 744, 745, 737, 804

See application file for complete search history.

(56) References Cited

U.S. PATENT DOCUMENTS

| 2,595,505 | A | * | 5/1952 | Bachle ..................... 60/804 |
| 3,932,988 | A |   | 1/1976 | Beaufrere |
| 4,040,251 | A |   | 8/1977 | Heitmann et al. |
| 4,343,148 | A |   | 8/1982 | Shekleton |
| 4,478,045 | A |   | 10/1984 | Shekleton |
| 4,598,544 | A |   | 7/1986 | Williams et al. |
| 4,769,996 | A |   | 9/1988 | Barbeau |
| 4,870,825 | A |   | 10/1989 | Chapman |
| 5,220,794 | A |   | 6/1993 | Sledd et al. |
| 5,317,864 | A |   | 6/1994 | Shorb et al. |

* cited by examiner

*Primary Examiner*—Ehud Gartenberg
(74) *Attorney, Agent, or Firm*—Christopher & Weisberg, P.A.

(57) ABSTRACT

An integrated gas turbine compressor and rotary fuel injector is provided which includes a rotary cup combustor having an atomizing element for dispersal and distribution of fuel throughout the combustor. The combustor is positioned in close proximity to the compressor impeller of a gas turbine engine having a centrifugal compressor. The rear face of the impeller, or the rear face of an attachment to the impeller, is contoured to receive the fuel supply. The contour terminates at a lip disposed at a larger radius from the centerline shaft than conventional shaft-mounted slingers. The larger radius of fuel release provides better fuel atomization due to larger rim speeds, thereby improving combustor performance.

20 Claims, 3 Drawing Sheets

INTEGRATED GAS TURBINE COMPRESSOR-ROTARY FUEL INJECTOR

CROSS-REFERENCE TO RELATED APPLICATION

This application is related to and claims priority to U.S. Provisional Patent Application Ser. No. 60/409,108, filed Sep. 9, 2002, entitled INTEGRATED GAS TURBINE COMPRESSOR-ROTARY FUEL INJECTOR, the entirety of which is incorporated herein by reference.

STATEMENT REGARDING FEDERALLY SPONSORED RESEARCH OR DEVELOPMENT n/a

FIELD OF THE INVENTION

The present invention relates to gas turbine engines and components thereof, and more particularly to a fuel injection system and method including a new rotary atomizer for a gas turbine engine having an annular combustor and centrifugal compressor.

BACKGROUND OF THE INVENTION

Known rotary fuel injection systems of "fuel slingers" generally comprise an annular combustor that receives fuel fed through holes in the rotating shaft connecting the compressor and turbine. Often the fuel injection systems will employ a rotating fuel reservoir feeding the fuel to the combustion region over a circumferential lip. Examples of such fuel slinger engines are shown in U.S. Pat. No. 3,932,988 (Beaufrere), U.S. Pat. No. 4,040,251 (Heitmann et al.), U.S. Pat. No. 4,598,544 (Williams et al.), U.S. Pat. No. 4,769,996 (Barbeau), and U.S. Pat. No. 4,870,825 (Chapman).

However current small gas turbine engines suffer from poor ignition reliability due to various limitations of current combustion systems. To overcome these limitations, many combustors use pyrotechnic starting devices, which add considerable expense and weight. Additional expense is added by the use of conventional fuel nozzles, which can easily clog. Together, fuel nozzles and pyrotechnic starters can account for 40% or more of the overall cost of a small turbojet.

It is desirable therefore to provide a better combustor system and method which eliminates the need for pyrotechnics and fuel nozzles, while improving ignition reliability, reducing combustor cost, allowing for smaller, more efficient combustors, which may be especially suited for small gas turbine engines. A smaller diameter combustor is especially desirable in that it provides greater space for fan bypass. For example, in small thrust size engines (having a static thrust at sea level of 150 lbf or less) a turbofan configuration will provide better fuel consumption rates and higher thrust for a given engine diameter over a turbojet. Therefore, an improved combustor system and method applicable to turbofan engines, and in particular a small thrust turbofan, is desirable.

SUMMARY OF THE INVENTION

In a first embodiment, the present invention advantageously provides a fuel injection system in a gas turbine engine, including an annular combustion chamber centered about a central rotational axis of the engine, and a centrifugal compressor having an impeller centered about the central rotational axis. The impeller has a contoured rear surface substantially opposite an air-receiving front surface. The rear surface includes a radially outboard portion defining a first lip protruding into a circumferential opening defined by the annular combustion chamber. A fuel supply line having a fuel release point is disposed proximate a portion of the rear surface radially inboard from the first lip. The rear surface, the first lip, and the circumferential opening together define a flow path for fuel to flow from the fuel supply line into the combustion chamber.

In another embodiment of the present invention, a gas turbine engine is provided, having an annular combustion chamber centered about a central rotational axis and defining a circumferential opening for receiving fuel. A centrifugal compressor having an impeller is centered about the central rotational axis. The impeller includes a contoured rear surface substantially opposite an air-receiving front surface. A fuel flow delivery means is provided for injecting fuel into the annular combustion chamber along the contoured rear surface and though the circumferential opening.

In yet another embodiment of the present invention, a method is provided for injecting fuel into a gas turbine engine combustor, including the steps of supplying fuel in a fuel line, and releasing fuel from the fuel line at a release point proximate a rear surface of a compressor-impeller. The rear surface is substantially opposite the air-receiving front surface of the compressor-impeller. The release point is at a first radially inboard position. A fuel flow is directed from the release point along the rear surface of the compressor-impeller outboard to a lip defined by the rear surface. The lip is substantially radially outboard of the first radially inboard position. The fuel flow is injected from the lip through a circumferential opening defined by the combustor.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention provides a gas turbine engine combustor having a rotary cup atomizing element for dispersal and distribution of fuel throughout the combustor. Examples of rotary atomizers used in gas turbine engines are shown in U.S. Pat. No. 4,343,148 (Shekleton) and U.S. Pat. No. 4,478,045 (Shekleton). However, the system and method of the present invention is unique in that it positions the combustor in close proximity to the compressor impeller of a gas turbine engine with a centrifugal compressor. The rear face of the impeller, or the rear face of an attachment to the impeller, is contoured to receive the fuel supply. The contour terminates at a lip disposed at a larger radius from the centerline shaft than conventional shaft-mounted fuel slingers. The larger radius of fuel release provides better fuel atomization due to larger rim speeds, which improves combustor performance.

The present invention is substantially directed to gas turbine engines having a central rotational axis about which the various components of the engine, including the fan, compressor, turbine, and the turbine shaft linking the compressor with the turbine, are centered. As used herein, the term "central rotational axis" shall mean the central axis about which the various components of a gas turbine engine rotate. In many cases, this central rotational axis is an axis of rotational symmetry, wherein the various engine components have shapes which are axisymmetric about the axis, including annular bodies or bodies of revolution about the central axis. Also as used herein, the terms "inboard" (or "radially inboard") and "outboard" (or "radially outboard") shall refer to positions radially outward from the central rotational axis that are nearer, or farther, respectively, from the central rotational axis. The "inboard" direction shall mean a radial direction facing towards the central rotational axis. And the "outboard" direction shall mean a radial direction facing away from the central rotational axis.

Figure 1:
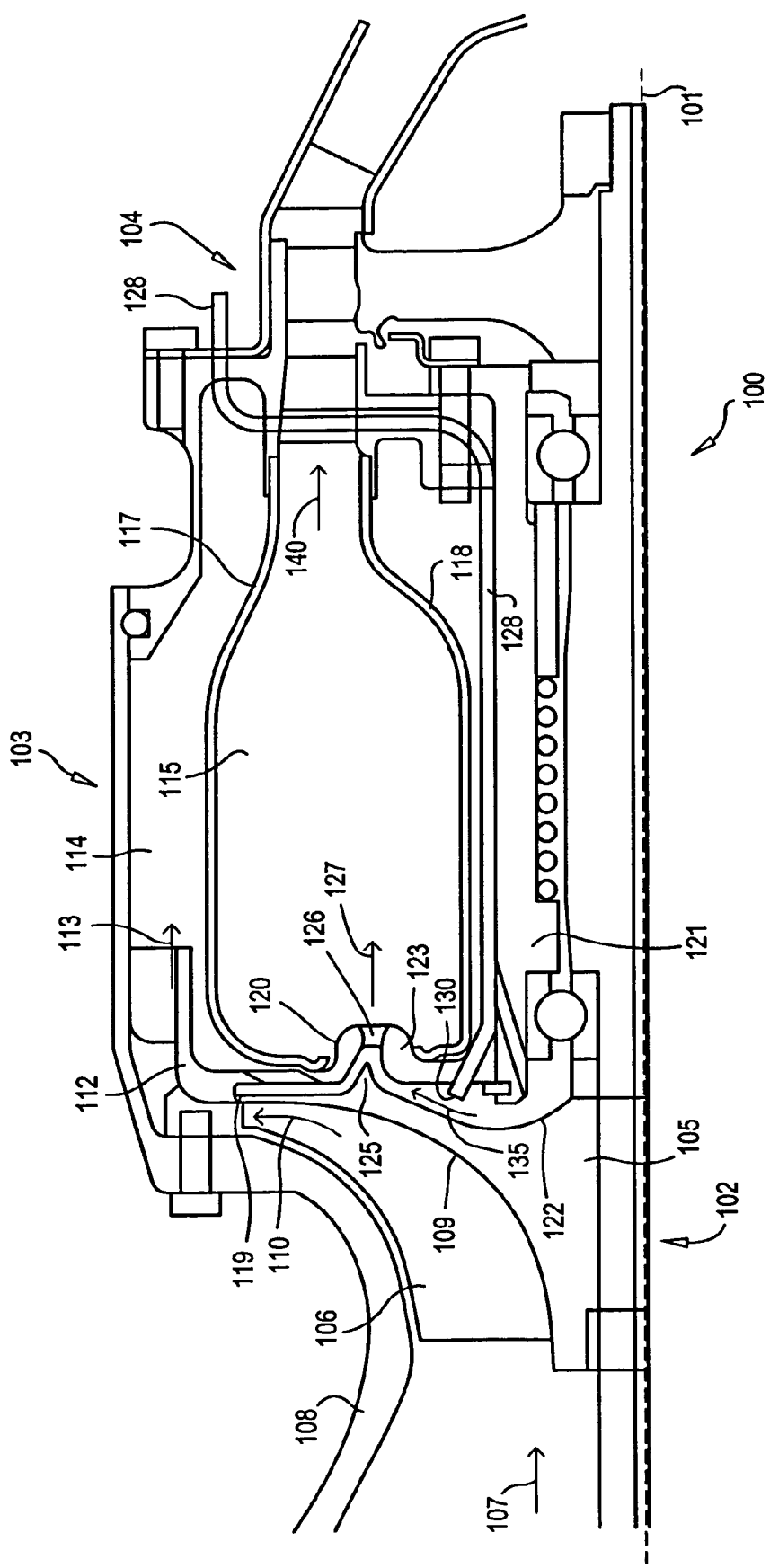
FIG. 1 is a longitudinal cross-sectional view of a gas turbine engine having a first embodiment of a combustor and fuel injection system of the present invention.

Turning now to the drawing figures, in which like reference designators refer to like elements, there is shown in FIG. 1 a longitudinal cross-sectional view of a gas turbine engine having a first embodiment of a combustor and fuel injection system of the present invention. Only one half of the gas turbine engine 100 is shown, it being generally axisymmetric about a central rotational axis 101. The engine 100 includes a compressor stage 102, a combustor stage 103, and a turbine stage 104. The compressor 102 includes an impeller 105 that has one or more vanes 106 which receive air flow incoming along arrow 107 as shown. As used herein, the term "air" shall refer to any fluid or fluid flow, including atmospheric air at all levels of altitude, as well as other fluids, gases, or oxidizers, as the case may be. Incoming air is compressed by the compressor 102, which may be a centrifugal design, but which may also incorporate axial stages upstream of a final centrifugal stage. The compressor 102 is surrounded by a shroud 108, such that airflow is compressed by the vanes 106 to flow between the impeller 105 and shroud 108 over an air-receiving front side surface 109 of the impeller 105, along arrow 110 as shown.

Part of the compressed air flow from the compressor 102 flows outboard over an outer casing 112 and generally flows along arrow 113 in a space 114 outboard of a combustion chamber 115 in the combustor section 103. The combustion chamber 115 is an annular chamber centered about the central axis 101, and is bounded by an outboard outer liner 117 and an inboard inner liner 118. The compressed air circulates through spaces and flow passages arranged both inboard and outboard around the chamber 115, and enters the chamber 115 through perforations, holes, and other passages through outer and inner liners 117 and 118.

However another major component of airflow from the compressor flows inboard after the vanes 106 over the radially distal or outboard tip 119 of the impeller 105. This flow is directed through a flow path defined by the outboard end portion 119 of the impeller 105 and the outer casing 112, which extends radially inboard to terminate at a lip 120. An inner casing 121 is disposed inboard of the inner liner 118 of the combustion chamber 115, and similarly extends radially behind a contoured rear surface 122 of the impeller 105, extending inboard to terminate at another lip 123. The rear surface 122 defines a lip 125 that protrudes axially downstream through a circumferential opening 126 defined by combustion chamber 115 between the lip of the outer casing 112 and the lip of the inner casing 123 as shown. The opening 126 is circumferential in that it extends all the way around the engine at the same axial and radial position on the upstream face of the annular combustion chamber 115. Fuel and air that are injected into the combustion chamber 115 through the circumferential opening 126 are generally directed to flow at a direction aligned with arrow 127 as shown. However, as discussed below, the actual trajectory of the fuel flow may be angled outboard from arrow 127 by up to 45 degrees (measured outboard away from the central axis 101).

The engine 100 includes a fuel injection system having a fuel supply line 128 that terminates at a fuel release point 130 just behind the rear face 122 of the impeller. The centrifugal forces generated by the rotating impeller direct the fuel to flow along the rear surface 122 radially outboard along arrow 135 as shown. This fuel flow then flows off the lip 125 through the opening 126 into the combustion chamber 115. After combusting in the chamber 115, the fuel and air mixture and combustion byproducts all flow out of the chamber 115 along arrow 140 and enter the turbine section 104.

Figure 2:
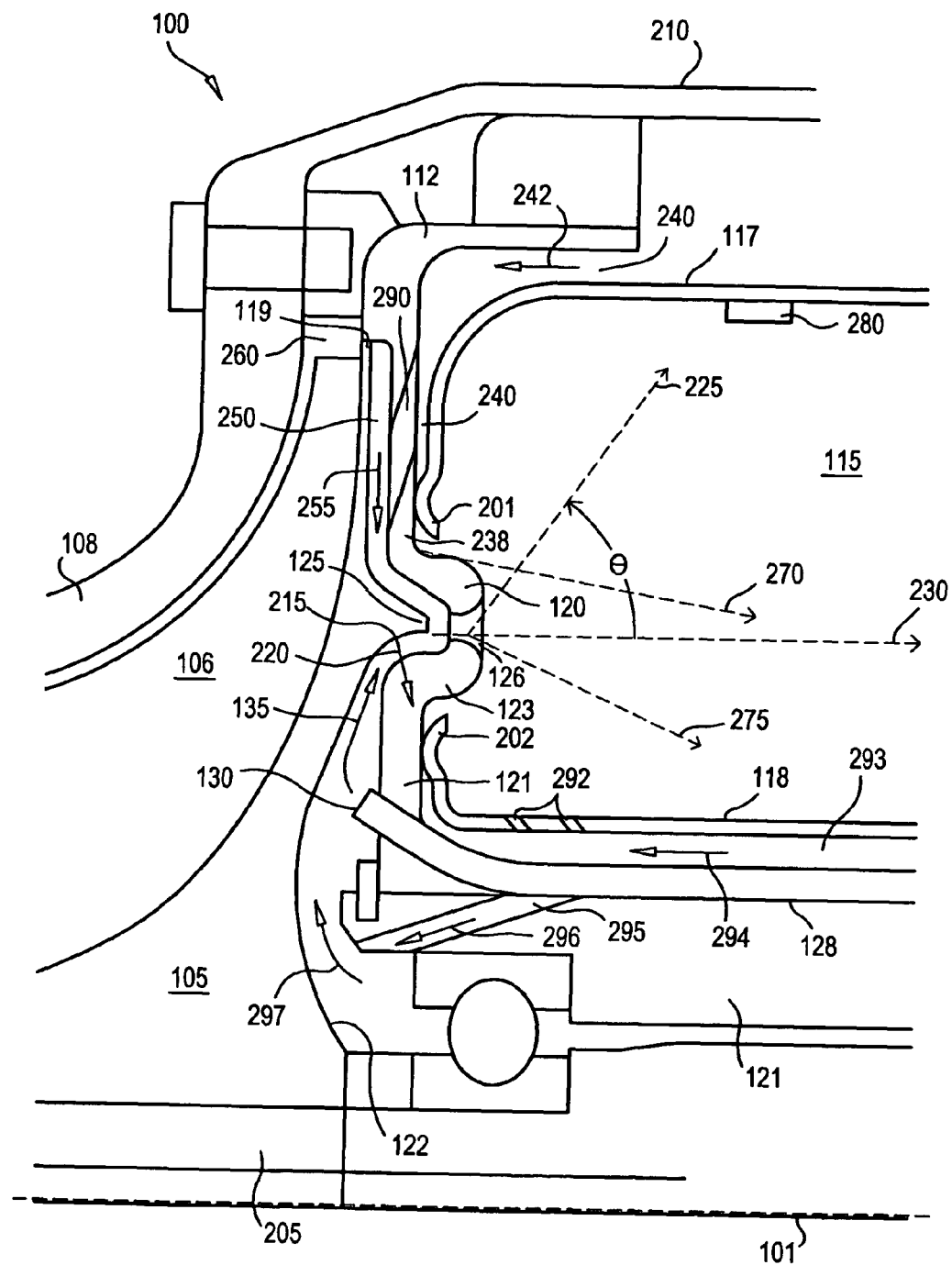
FIG. 2 is an enlarged view of the combustor and fuel injection system of the present invention shown in FIG. 1.

FIG. 2 is an enlarged view of the combustor and fuel injection system of the present invention shown in FIG. 1. As referred to herein, the fuel injection system includes and incorporates some or all of a number of elements and components in the engine 100, including the compressor-impeller 105, a fuel supply line 128, and two outer casings 112 and 121 enclosing the combustion chamber 115. The lip 125 defined by the rear surface 122 of the impeller 105 protrudes into the circumferential opening 126 defined by the inner and outer casings 112 and 121. This circumferential opening 126 is actually within a larger circumferential opening defined between: (i) the end portion 201 of the outer liner 117 of the combustion chamber 115, and (ii) the end portion 202 of the inner liner 118 of the combustion chamber 115. Both the end lip 120 of the outer casing 112 and the end lip 123 of the inner casing 121 protrude into this larger circumferential opening, into which the tip of the impeller lip 125 is directed. Fuel injected from the opening 130 in the fuel line 128 is centrifugally accelerated along fuel flow path 135 along a centrally outboard portion of the rear face 122 of the impeller 105, to flow off the lip 125 into the circumferential openings of the combustion chamber 115. Thus, the opening 130, rear surface 122, inboard surface of lip 125, and circumferential opening 126 collectively define a fuel flow path into the combustor 115 and therefore constitute a portion of the fuel injection system of the present invention.

It will be noted that the present invention provides a fuel release point and injection point into the combustor 115 that is significantly radially outboard from the central axis 101 and turbine shaft 205. This generates significantly higher rim speeds at the relatively large radial distance of the lip 125. However another major improvement in fuel injection is realized by the excellent atomization achieved by the dispersal of fuel from the lip 125. Smaller droplet sizes of injected fuel can be directly attributed to higher rotational speeds as well as the radius of the fuel release point. Indeed empirical studies have shown that droplet size varies inversely with the rotational speed and inversely with the square root of the fuel release radius or diameter. The present invention provides a fuel release radius that is at least one quarter of the overall engine diameter. As shown in FIGS. 1 and 2, the present invention provides a fuel release radius which is outboard at least one quarter or more of the radius of the engine from the central axis 101, which approximately translates to one-eighth of an overall engine diameter. As used herein, the "overall engine diameter" shall refer to a diameter of the engine measured approximately at the combustor stage of the engine, and may extend to the outboard liner 117, outer casing 112, or an outer shroud 210, as the case may be. This overall diameter is not meant to include the diameter of larger diameter portions of an engine, such as a fan stage upstream of the compressor.

As shown in FIG. 2, the portion of the rear surface 122 which is proximate the fuel release point 130 may be contoured to be substantially concave with respect to a view exterior to and facing the rear surface 122 along the central rotational axis 101. In this sense concave shall mean any geometry that bulges outward, such as a sphere when viewed from the inside of said sphere. The rear surface 122 need not however be concave at all, and may have a varied geometry, such as the embodiment of the present invention shown in FIG. 3 and discussed below.

However, in the present embodiment disclosed in FIG. 2, the junction of the portion of the rear surface 122 (inboard of the lip 125) and the lip 125 defines a cup surface 215, which itself is concave with respect to a view directed outboard and exterior to and facing the cup surface. A normal vector 220 directed out from the cup surface 215 will therefore tend to face a direction which will, if extended infinitely, intersect with the central axis 101. The cup surface 215 is therefore any contoured surface forming a portion of the rear surface 122 that will tend to hold a fluid when outboard centrifugal forces are applied to the fluid on the cup surface. In this manner, the cup surface defines a centrifugal fuel trap in a portion of the flow path 135 for fuel to flow from the fuel supply line 128 into the combustion chamber 115. This reservoir and accumulation point of fuel, which may be transient or steady state, depending on the operation of the engine, will help to allow for better fuel dispersal and atomization of the fuel when it is released off of lip 125.

Because of the centrifugal forces imparted on the fuel by the compressor-impeller 105, the fuel flow released from the lip 125 will tend to flow in a direction that is substantially outboard, such as along vector 225 as shown in FIG. 2. This generally does not provide for a good dispersal pattern within the combustor 115, wherein the fuel flow should be dispersed more evenly, such as around a central vector 230, roughly aligned with the central axis 101. The fuel injection system of the present invention incorporates several other elements which direct air to flow along multiple flow paths so as to mix with the fuel flow, control the trajectory of the fuel as it flows into the combustor 115, and thereby improve the performance of the engine. As discussed above with respect to FIG. 1, the combustion chamber 115 includes an inboard liner 118 and an outboard liner 117. A stationary outer casing 112 is disposed outboard of the outboard liner 118, the casing 112 having a front side wall 238 that extending radially inboard and is disposed between: (i) a distal end portion 119 of the impeller 105, which extends outboard of the lip 125, and (ii) the outboard liner 117 which extends radially inboard roughly parallel to the front side wall 238 of the outer casing 112, and terminates at end 201. The front side wall 238 defines a lip 120 at its radially inboard end, which second lip 120 is proximate and substantially parallel to the first lip 125. The front side wall 238 and the outboard liner 117 are therefore disposed adjacent each other to define a first flow path 240 for air flowing into the combustion chamber 115 from the compressor 102. This first flow path 240 extends upstream around the outer liner 117, and generally flows along arrow 242 as shown. In addition, the radially outboard distal end portion 119 of the impeller 105 and front side wall 238 of the outer casing 112 are adjacent one another to define a second flow path 250 for air flowing along arrow 255 into the combustion chamber 115 from the compressor 102. Both the first flow path 240 and the second flow path 250 each derive flow from the air flowing off the compressor vanes 106 at the radially outboard point 260 of the compressor.

Both the first flow path 240 and the second flow path 250 are disposed to direct airflow proximate the lip 125 to control a trajectory of fuel flowing from the lip 125 into the combustion chamber 115 through the circumferential opening 126. The first flow path 240 is generally directed to produce an airflow aligned along vector 270 as shown. The second flow path 250 is generally directed to produce an airflow aligned along vector 275 as shown. Both vectors 270 and 275 are generally perpendicular to the initial fuel flow vector 225, such that the mixing of air and fuel will thereby tend to result in a fuel trajectory that is directed in less of an outboard direction, and more along vector 230 into the central portion of the combustor chamber 115. When measured outboard from a vector 230 aligned with the central rotational axis 101, the angle $\theta$ of a resultant fuel trajectory is in the range of zero to forty-five degrees.

This angle of fuel dispersal serves an important function during start-up and operation of the engine. Initially, before significant air flow has accumulated through the combustion chamber 115, the fuel injection trajectory $\theta$ is substantially outboard, such that fuel will tend to be directed right at an igniter unit 280 disposed a certain distance downstream on the inside surface of the outer liner 117 of the combustor 115. This aids in ignition of the fuel and combustion process. When airflow is increased, the angle $\theta$ will tend to decrease and provide a more inboard fuel trajectory, thereby being directed away from the igniter 280 and dispersed more evenly through the combustion chamber 115. This aids in more efficient functioning of the engine at higher speeds.

The front side wall 238 also defines at least one channel 290 between the first and second flow paths 240 and 250 for air flowing into the combustion chamber 115 from the compressor. This enhances the mixing of flow between the two flow paths, and provides for better fuel injection characteristics. A similar arrangement of channels 292 is disposed on the inner liner 118 between the combustion chamber 115 and a space 293 between the inner liner 118 and the inner casing 121, where air from the compressor may flow along arrow 294 around the inner liner 118, over the end 202 of the inner liner 118, and into the combustion chamber 115 proximate the lip 123 of the inner casing 121. Another channel 295 may be defined by the inner casing 121, to provide airflow along arrow 296 within the channel 295, and thereafter along arrow 297 adjacent the rear surface 122 inboard of the fuel release point 130. This provides for pre-mixing of the fuel and air mixture prior to flowing up over lip 125.

Figure 3:
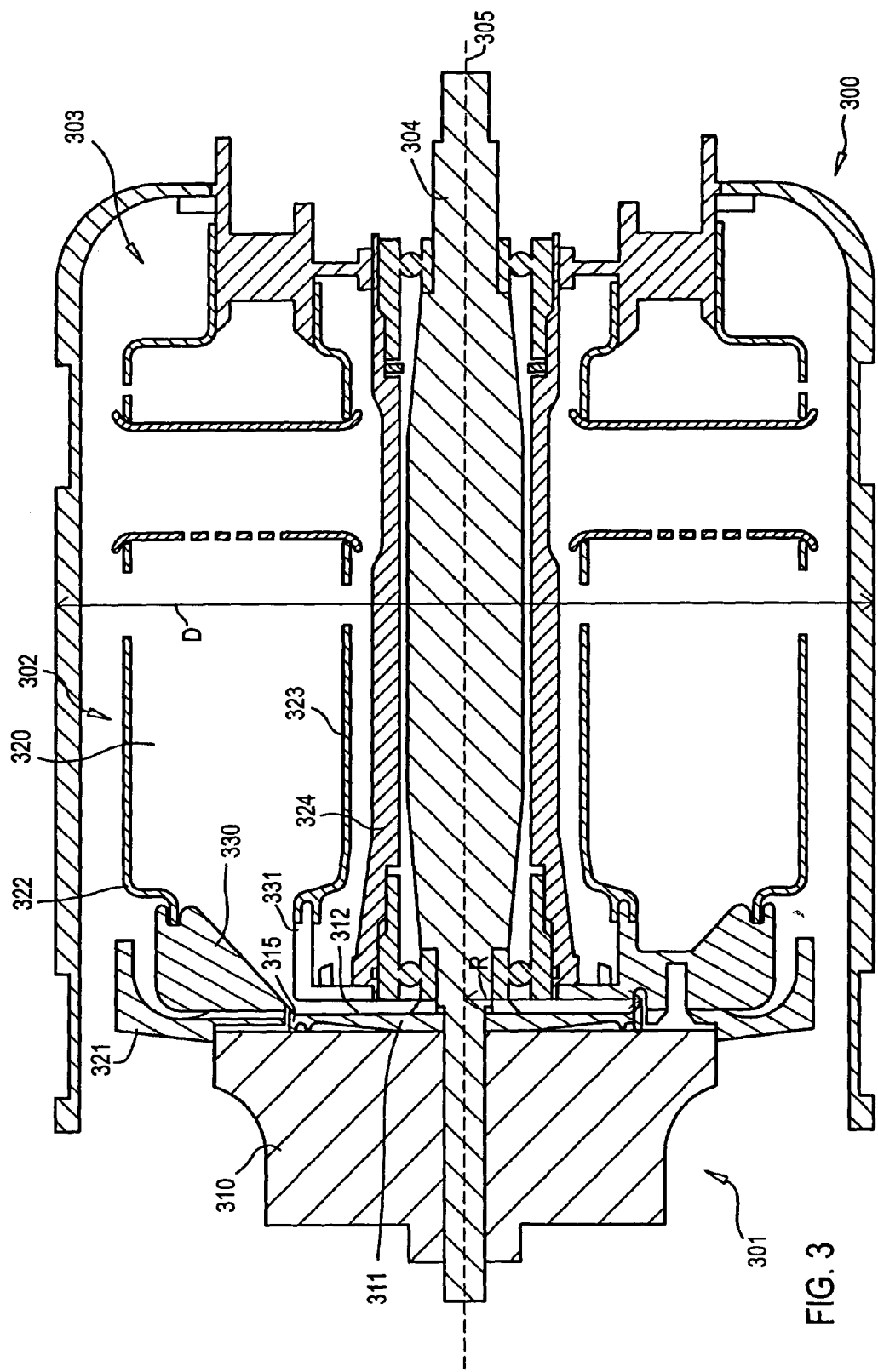
FIG. 3 is a longitudinal cross-sectional view of a gas turbine engine having a second embodiment of a combustor and fuel injection system of the present invention.

FIG. 3 is a longitudinal cross-sectional view of a gas turbine engine 300 having another embodiment of a combustor and fuel injection system of the present invention. Engine 300 includes a compressor section 301, a combustor section 302, and a turbine section 303, the compressor 301 being linked to the turbine 303 via shaft 304 centered about a central rotational axis 305. The compressor 301 includes an impeller 310. A separate disk 311 is attached adjacent to the impeller 310 as shown, such that the rear surface 312 of the disk 311 serves as the rear surface 312 of the impeller 310. The disk 311 allows for ease of manufacture and assembly of the compressor 301 and impeller 310 units, such that the desired contour on the rear surface 312 can be applied directly to the disk element 311, without having to specially machine the impeller 310. As used herein, the term "impeller" shall also include any separable attachments, such as disk 311, or other identifiable components that may be integrated with, fixedly or non-fixedly attached to, coupled with, or otherwise provided as part of an impeller or compressor-impeller assembly.

The radially distal outboard end portion of the disk element 311 includes a lip 315, such that fuel released inboard of the lip 315 proximate the rear face 312 of the disk 311 flows along a fuel path radially outboard along the rear surface 312 to the lip 315, and into the annular combustion chamber 320. As shown in FIG. 3, the geometry of the outer casing 321, outer liner 322, inner liner 323, and inner casing 324 around the combustion section 320 is somewhat different from the geometries of corresponding elements in the engine 100 shown in FIGS. 1 and 2. Additional circumferential opening elements 330 and 331 are coupled to the upstream ends of the outer and inner liners 322 and 323, respectively, to direct the flow of fuel and air into the combustion chamber 320. Overall, however, the arrangement of the lip 315 into the circumferential opening defined by the combustion chamber 320 provides a fuel release radius R from the central axis 305 that is at least one eighth of the overall engine diameter D measured across the combustor section 302. Indeed, the range of the ratio R/D may be has high as 0.3 or more.

The present invention therefore provides a new combustor system and method which is integrated with the compressor impeller in a centrifugal compressor based gas turbine engine, and results in improved ignition reliability, shorter combustor length, smaller droplet size and better atomization of fuel, improved fuel spray and injection trajectory angles, and simplified mechanical components. All of this is achieved without the use of expensive pyrotechnics or fuel nozzles.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A fuel injection system in a gas turbine engine, comprising:
   an annular combustion chamber centered about a central rotational axis of the engine;
   a centrifugal compressor having an impeller centered about the central rotational axis, the impeller having a contoured rear surface substantially opposite an air-receiving front surface, the rear surface having a radially outboard portion defining a first lip protruding into a circumferential opening defined by the annular combustion chamber; and
   a fuel supply line having a fuel release point proximate a portion of the rear surface radially inboard from the first lip, the rear surface, the first lip, and the circumferential opening defining a flow path for fuel to flow from the fuel supply line into the combustion chamber; wherein said first lip directs the fuel flow substantially parallel to said central rotational axis.

2. The fuel injection system of claim 1,
   wherein the first lip and circumferential opening are radially outboard at least one eighth of an overall diameter of the engine.

3. The fuel injection system of claim 1,
   wherein the portion of the rear surface is substantially concave with respect to a view exterior to and facing the rear surface along the central rotational axis.

4. The fuel injection system of claim 1,
   wherein a junction of the portion of the rear surface and the first lip defines a cup surface, which is concave with respect to a view directed outboard and exterior to and facing the cup surface.

5. The fuel injection system of claim 4,
   wherein the cup surface defines a centrifugal fuel trap in a portion of the flow path for fuel to flow from the fuel supply line into the combustion chamber.

6. The fuel injection system of claim 1,
   wherein the combustion chamber includes an inboard liner and an outboard liner, and further comprising:
   a stationary outer casing outboard of the outboard liner, the casing having a front side wall extending radially inboard and disposed between
       a distal end portion of the impeller outboard of the first lip, and
       the outboard liner of the combustion chamber;
   wherein the front side wall defines a second lip at a radially inboard end of the front side wall, the second lip being proximate and substantially parallel to the first lip.

7. The fuel injection system of claim 6,
   wherein the front side wall of the outer casing and the outboard liner of the combustion chamber define a first flow path for air flowing into the combustion chamber from the compressor, and
   wherein the distal end portion of the impeller and front side wall of the outer casing define a second flow path for air flowing into the combustion chamber from the compressor.

8. The fuel injection system of claim 7,
   wherein the first and second flow paths are disposed to direct airflow proximate the first lip to control a trajectory of fuel flowing from the first lip into the combustion chamber through the circumferential opening.

9. The fuel injection system of claim 8,
   wherein the trajectory forms an angle measured outboard from the central rotational axis, the angle being in the range of zero to forty-five degrees.

10. The fuel injection system of claim 7,
    wherein the front side wall defines at least one channel between the first and second flow paths for air flowing into the combustion chamber from the compressor.

11. A gas turbine engine, comprising:
    an annular combustion chamber centered about a central rotational axis and defining a circumferential opening for receiving fuel;
    a centrifugal compressor having an impeller centered about the central rotational axis, the impeller having a contoured rear surface substantially opposite an air-receiving front surface; and
    a fuel flow delivery means for injecting fuel into the annular combustion chamber along the contoured rear surface and through the circumferential opening; a fuel trajectory control means for directing airflow from the compressor to control a trajectory of fuel flowing from the fuel flow delivery means into the combustion chamber through the circumferential opening, wherein the trajectory forms an angle measured outboard from the central rotational axis, the angle being from zero to forty-five degrees.

12. The gas turbine engine of claim 11,
wherein the contoured rear surface includes a radially inboard portion, and further comprising a fuel supply means for releasing fuel proximate the radially inboard portion of the rear surface.

13. The gas turbine engine of claim 12,
wherein the radially inboard portion of the rear surface is substantially concave with respect to a view exterior to and facing the rear surface along the central rotational axis.

14. The gas turbine engine of claim 11, further comprising:
a centrifugal fuel trap means incorporated into the fuel flow delivery means for accumulating fuel on the contoured rear surface proximate the circumferential opening.

15. The gas turbine engine of claim 11,
wherein the combustion chamber includes an inboard liner and an outboard liner, and further comprising:
a stationary outer casing outboard of the outboard liner, the casing having a front side wall extending radially inboard and disposed between
    a distal end portion of the impeller outboard of the fuel flow delivery means, and
    the outboard liner of the combustion chamber;
wherein the front side wall, outer liner, and impeller collectively define a means for injecting air flow from the compressor into the combustion chamber.

16. The gas turbine engine of claim 15,
wherein the front side wall of the outer casing and the outboard liner of the combustion chamber define a first flow path for air flowing into the combustion chamber from the compressor, and the distal end portion of the impeller and front side wall of the outer casing define a second flow path for air flowing into the combustion chamber from the compressor.

17. The gas turbine engine of claim 16,
wherein the front side wall defines at least one channel between the first and second flow paths for air flowing into the combustion chamber from the compressor.

18. The gas turbine engine of claim 11,
wherein the circumferential opening is radially outboard at least one eighth of an overall diameter of the engine.

19. A method for injecting fuel into a gas turbine engine combustor, comprising:
supplying fuel in a fuel line,
releasing fuel from the fuel line at a release point proximate a rear surface of a compressor-impeller, the rear surface being substantially opposite the air-receiving front surface of the compressor-impeller, the release point being at a first radially inboard position,
directing a fuel flow from the release point along the rear surface of the compressor-impeller outboard to a lip defined by the rear surface, the lip being substantially radially outboard of the first radially inboard position,
injecting the fuel flow from the lip through a circumferential opening defined by the combustor substantially parallel to the central rotating axis of said compressor impeller.

20. The method of claim 19,
wherein the circumferential opening is radially outboard at least one eighth of an overall diameter of the engine.

* * * * *